Sept. 13, 1966  W. A. PLAGENBERG  3,272,370
COMBINATION POURING LIP AND COLLAR CONSTRUCTION
FOR LIQUID VESSELS
Filed April 20, 1964
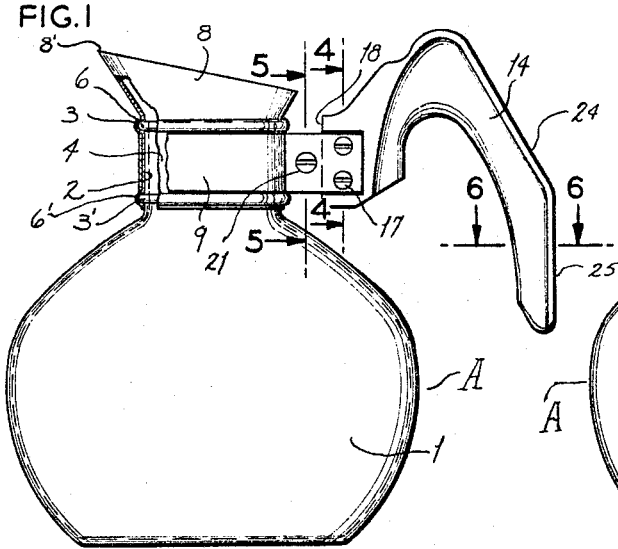
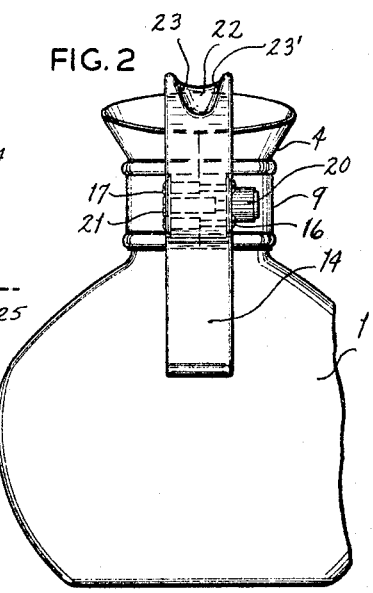
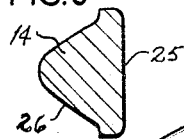
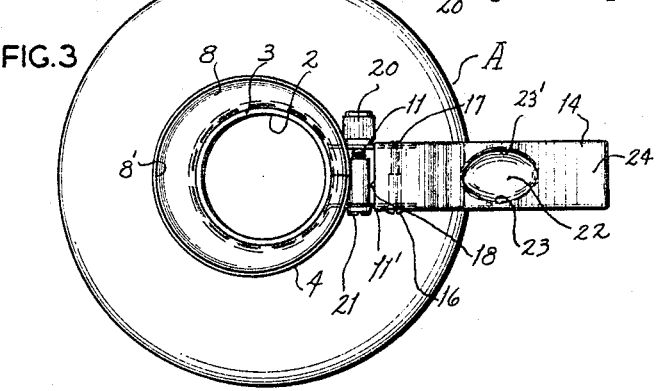
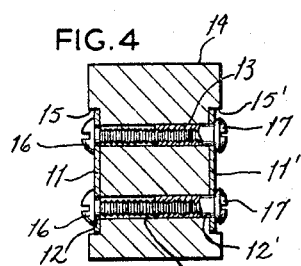
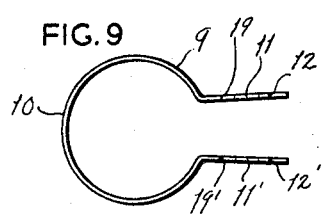
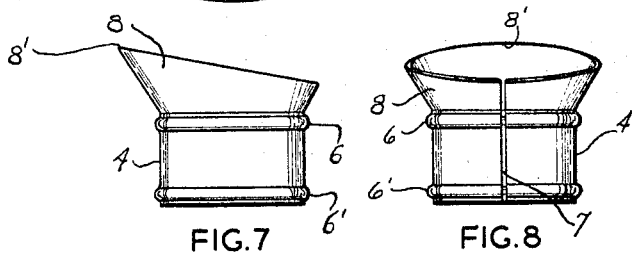
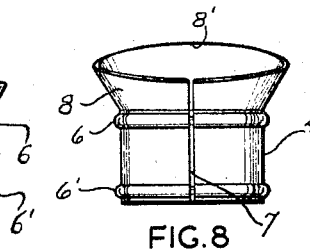
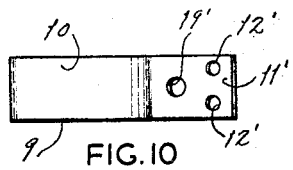
INVENTOR.
WALTER A. PLAGENBERG
BY Ralph W. Kalish
ATTORNEY

United States Patent Office 3,272,370
Patented Sept. 13, 1966

3,272,370
COMBINATION POURING LIP AND COLLAR CONSTRUCTION FOR LIQUID VESSELS
Walter A. Plagenberg, Berkeley, Mo., assignor to Star Coffee Company, St. Louis, Mo., a corporation of Missouri
Filed Apr. 20, 1964, Ser. No. 360,828
10 Claims. (Cl. 215—100)

This invention relates in general to liquid vessels, and, more particularly, to a combination pouring lip and collar construction therefor.

It is an object of the present invention to provide an unique combination pouring lip and collar member for detachable disposition upon liquid vessels, as of the decanter type commonly used for beverages such as coffee, tea and the like; said member being adapted for non-shiftable securement upon the vessel neck to thereby conduce to safe and reliable handling of the vessel.

It is another object of the present invention to provide a detachable pouring lip and collar member for beverage vessels which renders unnecessary the heretofore recognized provision of a pouring lip as an integral part of the vessel and which thus eliminates the accepted hazard of vessel damage or breakage resulting from the application upon such integral, normally glass, pouring lips of injurious forces developed through lifting of the vessel for dispensing purposes.

It is a further object of the present invention to provide a combination pouring lip and collar member for beverage vessels embodying cooperating means upon the vessel and the said member for assuring positive mutual interengagement so as to prevent undesired relative movement of the member axially of the vessel.

It is an additional object of the present invention to provide a combination pouring lip and collar member for liquid vessels the use of which markedly reduces the danger of breakage through handle slippage or pouring lip rupture; which obviates the necessity of an integral pouring lip on the vessel; which comprises a simplicity of parts, with components being of durable construction and resistant to damage; which components may be cheaply manufactured, and which may be easily mounted upon, and demounted from, a vessel, and which members are fully reliable in usage.

Other object and details of the invention will be apparent from the following description, when read in connection with the accompanying drawing wherein FIGURE 1 is a side view of a liquid vessel having mounted thereon a combination pouring lip and collar member constructed in accordance with and embodying the present invention.

FIGURE 2 is a rear view.

FIGURE 3 is a top plan view.

FIGURE 4 is a vertical transverse section taken on the line 4—4 of FIGURE 1.

FIGURE 5 is a vertical transverse section taken on the line 5—5 of FIGURE 1.

FIGURE 6 is a horizontal transverse section taken on the line 6—6 of FIGURE 1.

FIGURE 7 is a side view of the pouring lip and collar member.

FIGURE 8 is a rear view of the collar.

FIGURE 9 is a top plan view of the clamping band.

FIGURE 10 is a side view of the clamping band.

Referring now by reference characters to the drawing which illustrates the preferred embodiment of the present invention, A generally designates a liquid vessel, as of the decanter type, fabricated of glass or like material and being of the type commonly used for coffee, tea, and other hot beverages, such as particularly with commercial brewing units and hot plates. Vessel A comprises a bowl portion 1 and a diametrally reduced annular neck 2, the upper end edge of which is axially normal to the vertical axis of vessel A. Formed, as by molding, on neck 2 is a pair of vertically spaced apart, outwardly projecting beads 3, 3' which are continuous throughout the circumference of neck 2.

Provided for mounted disposition upon neck 2 is a split collar 4 made preferably from suitable sheet metal stock, being of substantially like height as neck 2 and incorporating vertically spaced apart, outwardly projecting ribs 6, 6' formed on such radius as to accommodate beads 3, 3' respectively when said collar 4 is disposed about neck 2 (FIGURE 1). Collar 4 is split along a vertical line of opening 7 in its rear portion. Integral with collar 4 and projecting upwardly and outwardly of the upper edge thereof, for extension beyond the upper end of neck 2, is a flared mouth 8, being of greater length forwardly than rearwardly to define a pouring lip 8'. Thus, collar 4 is integral with the lip 8' which latter is also fabricated of the same material, as metal, and by such unitary construction vessel A is devoid of the customary lip found on current decanter-type vessels. The inside diameter of collar 4 is normally slightly greater than that of neck 2 for facilitating initial disposition thereabout.

Presented for retaining collar 4 in mounted position is a clamping band 9 fabricated from a length of suitable sheet stock to comprise a generally annular body 10 having a height equal to, or slightly less than, the distance between ribs 6, 6' of collar 4 and being in its rearward portion, at its ends, integral with a pair of mounting arms 11, 11', which later, through the bias of said band 9, are normally urged away from each other as may best be seen in FIGURE 9. Each arm 11, 11' adjacent its rearward edge is drilled to form apertures 12, 12' for alignment with openings 13, 13' respectively, provided in the forward end portion of a lifting handle 14 having lateral recesses 15, 15' for reception of said arms 11, 11' thereby preventing inadvertent relative shifting of the latter. Extending through apertures 12, 12' of one arm 11 or 11' into openings 13, 13' are screws 16 which engage within screw-slotted nuts 17 projecting into the opposite ends of openings 13, 13' through apertures 12, 12' of the other arm 11, 11' as the case may be. Arms 11, 11' are of such length that the forward portions thereof constitute a bridge between the adjacent end face 18 of handle 14 and body portion 10 of clamping band 9. In such intervening region, each arm 11, 11' is provided with aligned openings 19, 19' respectively for receiving a thumbscrew 20 and a screw-slotted nut 21 (see FIGURE 5), mutual threading of which will cause the said forward portions of arms 11, 11' to be forced toward each other, against the inherent bias thereof, resulting in a constrictive action of body portion 10 of band 9 whereby the same is drawn snugly about collar 4, bringing the latter into tight, friction-producing abutment with neck 2. Accordingly, neck 2, collar 4, and band 9 are integrated into a unified rigid assembly resistant to undesired shifting or angular movement so that handle 14 may be manipulated without any inadvertent alteration in position of collar 4, assuring of proper presentation of pouring lip 8' at all times.

It will be seen that upon lifting of vessel A by use of handle 14, the lifting force will be transmitted through band 9 against upper rib 6 of collar 4 and the received bead 3. Thus, the present invention obviates the application of such force against the pouring lip as has been customary in constructions known heretofore wherein the pouring lip has been integral with the vessel and the mounting band of the handle encircling the neck of such vessels would necessarily abut edgewise against such lip. Band 9 is restrained against vertical displacement by detaining abutment against ribs 6, 6' which later, in turn, by virtue of interlocking engagement with beads 3, 3', inhibit collar 4 against vertical shifting. Therefore, no untoward force is applied against vessel mouth 8 since the latter is formed with collar 4 and the full pressure of lifting is dissipated by the composite neck-collar-band assembly.

Referring to FIGURES 1 and 2, the unusual configuration of lifting handle 14 is apparent wherein the uppermost portion thereof is provided with a central depression or valley 22 having upwardly and outwardly inclined sides 23, 23' to present a cradle for the end joint of the user's thumb, holding same against accidental lateral shifting. This particular feature prevents slipping as might occur from a user's wet hand with attendant loss of control or dropping of the vessel as has been experienced with current handle constructions devoid of such guard. Handle 14 also incorporates a downwardly and rearwardly inclined flat surface 24 providing a firm, friction-producing rest for the lower portion of the user's thumb; there being continuous with said surface 24 at its lower end a substantially vertical terminal flat portion 25 for disposition thereagainst of a portion of the user's palm. Forwardly of such surfaces 24, 25, handle 14 is of generally tapered cross section, as at 26, for according a reliable yet comfortable finger grip. Handle 14 represents a carefully contrived construction adapted for substantially slip-free gripping as well as ease of manipulation.

In view of the foregoing, the assembling of collar 4 and band 9 upon vessel A should be quite apparent, for, as indicated above, tightening of thumbscrew 20 will force band 9 snugly about collar 4 to develop a firm relationship with respect to neck 2 of vessel A. Disassembly, should it be desired for any reason, may be effected in a facile manner by removal of thumbscrew 20 and retaining screws 16.

The use of the present invention will provide longevity to vessel A, markedly relatively increased over that experienced with current vessels, and in the event of destruction of vessel A through any accident, the combination pouring lip and collar member, together with handle 14 and band 9, may be easily remounted upon a new vessel.

It should be understood that changes and modifications in the formation, construction, arrangement, and combination of the several parts of the combination pouring lip and collar construction for liquid vessels may be made and substituted for these herein shown and described without departing from the nature and principle of my invention.

Having thus described my invention, what I claim and desire to secure by Letters Patent is:

1. A liquid vessel construction comprising a vessel having a bowl and a neck, a collar detachably disposed about said neck, a pouring lip integral with said collar and projecting beyond the upper end of said neck, cooperating means provided on said collar and said neck for interengagement, said means comprising at least one laterally outwardly projecting bead provided on said neck and a complementary rib provided on said collar for embracingly receiving said bead, and a clamping member for retaining said collar securely upon said neck.

2. A liquid vessel construction as defined in claim 1 and further characterized by said cooperative means for interengagement of said collar and said neck comprising a pair of vertically spaced apart outwardly convex, laterally projecting beads formed on said neck and a pair of complementary ribs provided on said collar for respectively, snugly receiving said beads.

3. A liquid vessel construction comprising a vessel having a bowl and a neck, a pair of vertically spaced apart, laterally outwardly, rounded projecting beads provided on said neck, a collar detachably disposed about said neck and having a pair of vertically spaced apart ribs complementary with said beads for respectively, snugly receiving same to thereby inhibit vertical shifting of said collar, a clamping band having an annular portion for disposition about said collar between said ribs, a pair of arms continuous with said band, and a lifting handle secured to said arms.

4. A liquid vessel construction as defined in claim 3 wherein the height of said clamping band is substantially equal to the distance between the ribs of said collar whereby abutment of the edges of said band against said ribs prevents vertical shifting of said band.

5. A liquid vessel construction as defined in claim 3 and further characterized by said handle having an upwardly opening recess in its upper portion for receiving the end joint of the user's thumb, there being a hand gripping portion extending downwardly and rearwardly from said upper portion.

6. A liquid vessel construction comprising a vessel having a bowl and an annular neck, the upper end of said neck being planarwise normal to the vertical axis of said vessel, said neck having a pair of vertically spaced apart, outwardly projecting beads integrally formed thereon, a split collar detachably disposed encirclingly about said neck, said collar having a pair of vertically spaced apart, outwardly projecting ribs complementary to said beads for receiving the latter for inhibiting relative vertical shifting of said collar, a flared pouring lip integrally formed with said collar and projecting upwardly from the upper end thereof beyond the upper end of said neck, a a clamping member comprising an annular portion disposed about said collar, said annular portion having a height substantially equal to the distance between said collar ribs, a pair of arms extending from the ends of said annular portion, said arms being normally biased away from each other, adjustment means provided on said arms for drawing same toward each other, for effecting tight disposition of said annular portion about said collar for securing same into fixed position on said neck, and a lifting handle engaged to said arms.

7. In a liquid vessel construction having a bowl and an annular neck, a collar detachably disposed encirclingly about said neck, a flared pouring lip integrally formed with said collar, an annular clamping member disposed about said collar, a pair of arms extending from the ends of said annular clamping member, adjustment means provided on said arms for drawing same toward each other for effecting tight disposition of said clamping member about said collar for securing same into rigid position on said neck, and a lifting handle engaged to said arms, wherein the improvement comprises:

(a) a pair of vertically spaced apart, planarwise parallel, outwardly projecting beads formed on said neck, (b) a pair of vertically spaced apart planarwise parallel, outwardly projecting ribs formed on said collar, said ribs being complementary with said beads for snugly receiving same for precluding vertical shifting of said collar, (c) the inner face of said collar being in surface-to-surface relationship with the outer face of said neck, and (d) said annular clamping member being in intimate surface-to-surface relationship on its inner face with the outer face of said collar between said ribs, said clamping member being snugly received between said ribs, whereby the latter are in detent relationship with respect to the proximate edges of said member to prevent vertical displacement thereof.

8. In a liquid vessel construction as defined in claim 7 and further characterized by said beads extending throughout the circumference of said neck, said collar being in surface-to-surface relationship with the outer face of said neck throughout the entire vertical extent of said collar and said annular clamping member being in surface-to-surface relationship throughout its vertical extent with the outer face of said collar.

9. In a liquid vessel construction as defined in claim 8, and further characterized by said beads being of substantially hemispherical configuration and projecting laterally outwardly from the said neck.

10. In a liquid vessel construction as defined in claim 7, and further characterized by said handle having an upwardly opening recess in its upper portion for receiving the end joint of the user's thumb.

References Cited by the Examiner

FOREIGN PATENTS 1,328,388  4/1963  France.

THERON E. CONDON, *Primary Examiner.*

J. B. MARBERT, *Assistant Examiner.*